United States Patent
Chao

(10) Patent No.: US 9,185,284 B2
(45) Date of Patent: Nov. 10, 2015

(54) INTERACTIVE IMAGE COMPOSITION

(71) Applicant: QUALCOMM Incorporated, San Diego, CA (US)

(72) Inventor: Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 14/079,845

(22) Filed: Nov. 14, 2013

(65) Prior Publication Data

US 2015/0070523 A1    Mar. 12, 2015

Related U.S. Application Data

(60) Provisional application No. 61/874,950, filed on Sep. 6, 2013.

(51) Int. Cl.
| | |
|---|---|
| *H04N 5/232* | (2006.01) |
| *H04N 5/262* | (2006.01) |
| *G06T 3/40* | (2006.01) |
| *G06T 5/50* | (2006.01) |

(52) U.S. Cl.
CPC .......... *H04N 5/23216* (2013.01); *G06T 3/4038* (2013.01); *G06T 5/50* (2013.01); *H04N 5/23229* (2013.01); *H04N 5/23293* (2013.01); *H04N 5/262* (2013.01); *G06T 2207/20092* (2013.01); *G06T 2207/20221* (2013.01); *G06T 2207/30196* (2013.01)

(58) Field of Classification Search
CPC ... H04N 5/272; H04N 2101/00; H04N 5/772; H04N 5/2621; H04N 5/2625
USPC ........................................................ 348/239
See application file for complete search history.

(56) References Cited

U.S. PATENT DOCUMENTS

| | | | |
|---|---|---|---|
| 6,771,304 B1 * | 8/2004 | Mancuso et al. | 348/39 |
| 7,221,395 B2 * | 5/2007 | Kinjo | 348/239 |

(Continued)

FOREIGN PATENT DOCUMENTS

| | | |
|---|---|---|
| WO | WO-9825402 A1 | 6/1998 |
| WO | WO-2006085827 A1 | 8/2006 |

OTHER PUBLICATIONS

Agarwala, A., et al., "Interactive Digital Photomontage," ACM SIGGRAPH '04, SIGGRAPH 2004 Papers, pp. 294-302.

(Continued)

*Primary Examiner* — James Hannett
(74) *Attorney, Agent, or Firm* — Knobbe, Martens, Olson & Bear LLP

(57) ABSTRACT

Certain embodiments relate to systems and methods for generating a single group image from multiple captured images. A first image and a second image may be captured, the first image including a first part of a group and the second image including a second part of the group. A user interface may be provided, in some embodiments, for capture of the second image that enables a photographer to provide input regarding the relative positioning of the first and second image as well as providing input on the relative positioning of the first and second parts of the group and the image scene background. In some embodiments, a lowest energy seam line may be determined for an overlapping portion of the first and second images, and the lowest energy seam line may be used for generating a final stitched image including both the first and second parts of the group.

30 Claims, 8 Drawing Sheets

(56) References Cited

U.S. PATENT DOCUMENTS

| | | | |
|---|---|---|---|
| 7,656,429 B2 | 2/2010 | Larson | |
| 8,275,215 B2* | 9/2012 | Mei et al. | 382/284 |
| 8,902,335 B2* | 12/2014 | Doepke et al. | 348/239 |
| 2002/0071042 A1 | 6/2002 | Enomoto | |
| 2004/0257384 A1 | 12/2004 | Park et al. | |
| 2005/0129324 A1* | 6/2005 | Lemke | 382/254 |
| 2006/0078224 A1* | 4/2006 | Hirosawa | 382/284 |
| 2007/0081081 A1 | 4/2007 | Cheng | |
| 2009/0021576 A1 | 1/2009 | Linder et al. | |
| 2010/0034463 A1* | 2/2010 | Hamada | 382/190 |
| 2011/0109763 A1 | 5/2011 | Han et al. | |
| 2012/0218441 A1* | 8/2012 | Counts et al. | 348/239 |
| 2012/0274813 A1 | 11/2012 | Ishibashi | |
| 2013/0120442 A1 | 5/2013 | Dhawan | |

OTHER PUBLICATIONS

"Avidan, S., et al., "Seam Carving for Content-Aware Image Resizing," ACM Transactions on Graphics (TCG)—Proceedings of ACM SIGGRAPH 2007, vol. 26, No. 3, Jul. 2007 Article No. 10, pp. 10-1-10-9."

Pérez, P., et al., "Poisson Image Editing," SIGGRAPH '03 ACM, SIGGRAPH 2003 Papers, pp. 313-318.

Wagner D., et al., "Real-time panoramic mapping and tracking on mobile phones," Virtual Reality Conference (VR) 2010 IEEE, Mar. 20, 2010, pp. 211-218.

Efros, A.A., et al., "Image Quilting for Texture Synthesis and Transfer," ACM SIGGRAPH 2001, Aug. 12-17, 2001, Los Angeles, CA, pp. 341-346.

International Search Report and Written Opinion—PCT/US2014/053880—ISA/EPO—Mar. 6, 2015.

Kwatra V., et al., "Graphcut Textures: Image and video synthesis using graph cuts", ACM Transactions on Graphics (TOG), ACM, US, vol. 22, No. 3, Jul. 1, 2003, pp. 277-286, XP002379286, ISSN: 0730-0301, DOI: 10.1145/882262.882264.

Partial International Search Report—PCT/US2014/053880—ISA/EPO—Dec. 5, 2014.

Zhi Q., et al., "Toward Dynamic Image Mosaic Generation With Robustness to Parallax", IEEE Transactions on Image Processing, IEEE Service Center, Piscataway, NJ, US, vol. 21, No. 1, Jan. 1, 2012, pp. 366-378, XP011390282, ISSN: 1057-7149, DOI: 10.1109/TIP.2011.2162743.

* cited by examiner

INTERACTIVE IMAGE COMPOSITION

CROSS-REFERENCE TO RELATED APPLICATIONS

The present application claims the benefit under 35 U.S.C. §119(e) of U.S. Provisional Patent Application No. 61/874,950, filed on Sep. 6, 2013, entitled "INTERACTIVE IMAGE COMPOSITION," the entire contents of which is hereby incorporated by reference herein in its entirety and for all purposes.

TECHNICAL FIELD

The systems and methods disclosed herein relate generally to image stitching, and more particularly, to generating a single group image from multiple captured images.

BACKGROUND

Digital imaging capabilities have been integrated into a wide range of devices, including digital cameras, tablet computers, and mobile phones. Digital imaging devices and image capture systems can refer to any type of device that can capture one or more digital images, including devices that capture still images or videos.

The integration of digital processing technology with imaging devices has enabled more powerful and easier to use photographic products, and has enabled compact devices to capture and enhance image data. For example, digital imaging devices may employ image stitching, which is the process of combining multiple photographic images with overlapping fields of view to produce a segmented panorama or high-resolution image. Commonly performed through the use of computer software, most approaches to image stitching align the edges of two or more images, determine overlapping regions of the edges, and combine the images based on the overlapping regions, for example into a panorama. Some digital imaging devices can stitch their photos internally, while some image stitching techniques are performed on a separate computing device.

As another example, digital imaging devices may employ image blending, which is the process of integrating an object or portion of a first image into a scene of a second image. This type of operation is useful for correcting, repairing or modifying digital images as well as for creating photo-montages. Image blending typically requires selection of the object or portion from the first image by a user, which can be a time consuming process requiring familiarity with a variety of tools in conventional image editing software. Consequentially, several problems arise including the fact that seams are typically introduced between the edited region and the rest of the original image.

One common use of an image capture device such as a digital camera is capturing an image of a group of people. However, the photographer is often part of the group and therefore the group and photographer may desire that the photographer be included in the image. One solution to this is to ask another person, not in the group, to take the image. However, there are not always other people available to act as photographer. Another solution to the problem of including the photographer in the group image is to use the camera's self-timer feature to capture the image, giving the photographer time to join the group after setting up the shot. However, use of the self-timer generally requires balancing the camera on a nearby object. There is not always such an object readily available, and use of an available nearby object often results in less-than-ideal framing and/or focus of the group image. Manually blending the photographer, as imaged in a separate photo, into the group photo is a time-intensive digital editing process requiring skill and familiarity with specialized software.

SUMMARY

Accordingly, it can be desirable to provide image capture systems which allow for dynamic image stitching to form a group image, and which provide a quick and effective tool to simplify the actions needed by the user. An embodiment of the systems and methods discussed herein can provide a user interface, for example in a viewfinder of an image capture device or another display associated with the image capture device, which enables a first photographer to capture a first image of a first part of a group, and then enables a second photographer to see a translucent overlay of the first image while capturing a second image of a second part of the group which can include the first photographer or vice versa. The user interface may also allow a user to adjust relative positioning of the first image and the second image. The relative positioning can be used to align the first and second images for image stitching. The user interface can also allow the user to identify a seam line area, which may be used for stitching a portion of the first image with a portion of the second image.

In another embodiment, an image capture system can automatically determine a seam line for an overlapping area of the first and second images, and the seam line can be used to stitch the first and second images together. The seam line can be a boundary between a region of the first image that is stitched to a region of the second image.

In one embodiment, the lowest energy path for a seam line may be determined by subtracting the gradient values of each pixel of the first image in the overlapping region from the gradient values of the corresponding pixel in the second image, or vice versa. In other embodiments, luminance or chrominance values of the pixels may be used instead of or in addition to gradient values. In embodiments stitching together two grayscale images, one or both of luma and gradient values may be used. In embodiments stitching together two RGB images, some or all of luminance, chrominance, and gradient values may be used.

One aspect relates to a method, implemented by one or more computing devices configured with specific executable instructions, of capturing a first image of a first part of the group; generating a live preview on a display of the electronic device of a second image, the second image comprising a second part of the group; superimposing at least a portion of the first image onto the live preview of the second image; capturing the second image of the second part of the group using the user input; receiving user input regarding relative positioning of the first image and one of the live preview of the second image and the second image; and stitching the first image and the second image into a final stitched image based at least in part on the user input, the final image comprising the first part of the group and the second part of the group.

Another aspect relates to an image capture device comprising an image sensor configured to capture a first image of a first part of a group of individuals and a second image of a second part of the group; a display configured to display a live preview of the second image, the display further configured to display at least a portion of the first image superimposed over the live preview of the second image; a user input module configured to receive user input regarding relative positioning of the live preview of the second image and the at least a portion of the first image; and an image stitching module configured to stitch the first image and second image into a final image based at least in part on the user input, the final image comprising the first part of the group and the second part of the group Another aspect relates to a method of determining a low energy seam line, as implemented by one or more computing devices configured with specific executable instructions, comprising receiving image data comprising a first image and a second image; determining an overlapping region of the first image and the second image, the overlapping region comprising a plurality of pixels; selecting a starting pixel, the starting pixel adjacent to a plurality of adjacent pixels; computing a difference value for each of the plurality of adjacent pixels; selecting one of the plurality of adjacent pixels as a current seam line pixel; and constructing seam line pixel location data comprising first location data of the starting pixel and second location data of the current seam line pixel.

Another aspect relates to a seam line generation system comprising an overlap determination module configured to determine an overlapping region of a first image and a second image; a seam generator configured to generate a low energy seam line within the overlapping region, the low energy seam line representing a boundary for stitching the first image to the second image; and a seam energy calculator configured to calculate a total energy level of the seam line.

BRIEF DESCRIPTION OF THE DRAWINGS

Specific implementations of the invention will now be described with reference to the following drawings, which are provided by way of example, and not limitation.

DETAILED DESCRIPTION

Introduction

Figure 1C:
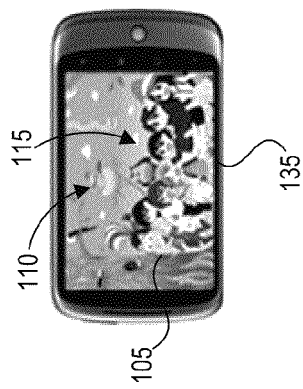
FIGS. 1A-1C illustrate various user interface displays illustrating a process of generating a combined group image.

The image capture and stitching techniques described herein can capture and stitch two or more images, each containing a portion of a group and substantially similar backgrounds. Some embodiments can implement a user interface designed to receive user input at various stages of the process, for example at image alignment and at locating a seam line defining a boundary for stitching the images together. Some embodiments can implement an automated process for aligning the images and generating a seam line having a low energy level, indicating that the seam line is likely to produce a visually pleasing stitched image result. Still other embodiments can combine user input and automatic image alignment to recommend capture and stitching features to the user while allowing the user to modify the recommended features, if desired.

An embodiment of the systems and methods discussed herein can provide a user interface, for example in a viewfinder of an image capture device or another display associated with the image capture device, which enables a photographer to capture a first image of a first part of a group, and then see a translucent overlay of the first image while capturing a second image of a second part of the group. In one embodiment, the second image is captured to include additional people that were not part of the first group captured in the first image. Other embodiments may present a translucent overlay of a preview image of the second image over an opaque first image in the viewfinder. In some embodiments, a user can control translucency parameters, for example by selecting which of the first and second image will be displayed with translucency and selecting an opacity level for the selected image.

The user interface may also allow a user, for example the second photographer, to adjust relative positioning of the first image and the second image. In some embodiments, the translucent overlay of the first image may be realigned with a viewfinder preview image of the second image during capture of the second image. In an implementation of the image capture device having a touch sensitive screen, for example, the user can use a finger drag or swipe gesture to reposition the translucent image relative to the opaque image, can use a two-finger pinch to zoom in or out of the translucent image or opaque image, and can use a rotation drag gesture to align a horizon of the translucent image and a horizon of the opaque image. Buttons or voice controls can be used in other implementations to align the first and second images. The relative positioning can be used to align the first and second images for image stitching. The user interface can also allow the user to identify a seam line area, which may be used for stitching a portion of the first image with a portion of the second image.

Some embodiments can automatically align and stitch the images, and can automatically determine a seam line as the boundary for stitching the images. Seam lines may be determined for an overlapping portion of the first image and the second image. Some embodiments may automatically align the first and second images to determine overlap, while some embodiments may determine overlap based at least partly in on user alignment of the images. The lowest-energy path determination process may then search the overlapping region for a lowest energy path, and may use that path to stitch the images or image foregrounds together.

A low or lowest energy seam line can be determined by selecting a starting pixel in the overlapping area and identifying a value of the starting pixel, such as luminance, chrominance, depth, or another pixel value. The value can be determined for the pixels adjacent to the starting pixel, and a difference value can be computed for each of the plurality of adjacent pixels representing the difference between the adjacent pixel's value and the starting pixel's value. One of the adjacent pixels can be set as a current seam line pixel, for example the adjacent pixel having the lowest difference value. Difference values may then be calculated for pixels adjacent to the current seam line pixel and a next current seam line pixel can be selected until an edge of the overlapping area is reached. Coordinates or locations of the starting pixel and other seam line pixels can be stored to construct seam line pixel location data, which can be used to stitch the images together.

In some embodiments, multiple seam lines can be generated, for example from an energy map of the pixels in the overlapping region. The energy map can be generated from gradient magnitude in some embodiments. Selecting one of the multiple seam lines to use for image stitching can involve examining the accumulated energy cost, e.g. least accumulated gradient difference, of each seam line. If there are two or more seam lines having the same lowest accumulated energy cost, one may be selected over the other for image stitching, in some embodiments based on the length of the seam line, i.e. a seam line which moves directly downwards can be preferred to a seam line which moves in a diagonal direction. In other embodiments, a seam line pixel having the maximum difference can be determined for each seam line, and the seam line having the lowest maximum difference value can be selected. In further embodiments, multiple possible unique stitching results can be generated by using the seam lines and can be presented to the user, and the user can choose from the stitched image options.

The lowest-energy path determination process may begin at a starting pixel, which may be the left-most pixel in the top row of the overlapping region in some embodiments, but could be any other pixel within the overlapping region in other embodiments. The lowest-energy path determination process may then compute a difference value between the pixel values from the first image and the second image for each of the pixels adjacent to the starting pixel. The pixel having the lowest difference value may be set as a current seam line pixel, and the seam line may be drawn in the direction of the current seam line pixel. In some embodiments, location information of the current seam line pixel may be stored in a memory containing seam line pixel location data. The seam line pixel location data may be used to construct the seam line during image stitching.

In some embodiments, if no adjacent pixel has a difference value below a threshold, the lowest-energy path determination process may set a different pixel as the starting pixel and may compute difference values for the pixels adjacent to the new starting pixel. If no pixel in the overlapping region is determined to have a difference value below the threshold, then the lowest-energy path determination process may indicate to the user that the first image and second image do not contain sufficient similarities, and the user may be presented with a selectable option to adjust the threshold or to capture new images for stitching.

After determining a current seam line pixel, the lowest-energy path determination process may compute a difference value between the pixel values from the first image and the second image for each of the pixels adjacent to the current seam line pixel. If no adjacent pixel has a difference value below a threshold, then the process may begin again with a new starting pixel. If at least one adjacent pixel has a difference value below the threshold, then the current seam line pixel may updated to be the adjacent pixel having the lowest difference value, and the seam line pixel location data may be updated to include the location information of the updated current seam line pixel. In some embodiments, the seam line pixel location data may be used for comparison of a current seam line pixel location with previous seam line pixel locations. If the current seam line pixel location data matches any entry within the previous seam line pixel location data, then the seam line has crossed back to itself and the process may become stuck in an infinite loop if allowed to continue. Accordingly, if the current seam line pixel location data matches any entry within the previous seam line pixel location data, then the process may select a new starting pixel and begin again.

The lowest-energy path determination process may continue to compute a difference value between the pixel values from the first image and the second image for each of the pixels adjacent to the current seam line pixel, so long as at least one difference value for an adjacent pixel falls below a threshold and as long as the current seam line pixel location data does not match any entry within the previous seam line pixel location data, until the process reaches a pixel in a final row of the overlapping region. When the process determines that the starting pixel of the seam line is in the starting row and the final pixel of the seam line is in the final row, the process may store the completed seam line, or may output the completed seam line for presentation to a user or for image stitching. In embodiments which begin drawing the seam line with a starting pixel in the top row, the final row may be the bottom row. In some embodiments, if the seam line terminates on an edge row, the process may present the seam line to the user with an indication that the seam line may provide for an incomplete final stitched image, or may begin again with a new starting pixel.

In some embodiments, a total energy level of a completed seam line may be calculated, for example by summing the difference values of each seam line pixel. The total energy level of the seam line may be compared to a threshold before use in image stitching or before presentation to a user. As discussed below, the total energy of the completed seam line may be used to generate an indication to the user of a likely quality of a final stitched image. In some embodiments a plurality of low energy seam line options may be presented to the user instead of a single lowest energy seam line, the low energy seam line options each having a total energy level below a threshold.

As mentioned, some embodiments can combine user input and automatic determination of image stitching factors. In an embodiment, the user-guided group image capture interface can allow the user to view, modify, or input one or more of image alignment and seam line locations. If multiple seam lines have been generated, the user can have the option to select which of the seam lines to use to stitch the images together. In some embodiments, an appearance of the seam line can change to indicate a total energy of the seam line to the user, for example by displaying seam lines in a color spectrum based on energy level. To illustrate, green seam lines can represent low energy seam lines, yellow can represent midlevel energy seam lines, and red seam lines can represent high energy seam lines in an embodiment. The system can change the appearance of seam lines generated automatically or input by the user to provide an indication of the seam line energy.

If the user modifies the spatial relationship between the first and second image, for example by repositioning one of the images relative to the other, updated seam lines can be automatically generated and/or displayed in some embodiments. A preview of the final stitched image generated from the first and second images using the current positioning and/or selected seam line can be output to the user for use in deciding whether to proceed with image stitching using the current image positioning and the currently selected seam line for stitching.

Implementations disclosed herein provide systems, methods and apparatus for generating a combined group image from multiple images containing subsets of the group. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Overview of Example User Interfaces

Figure 1B:
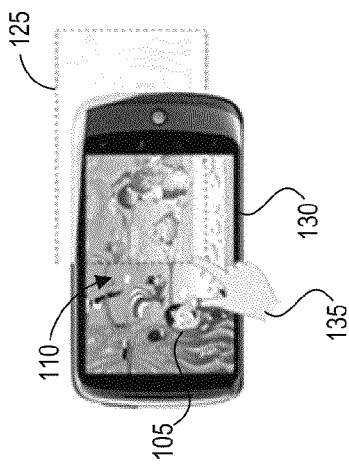
Figure 1A:
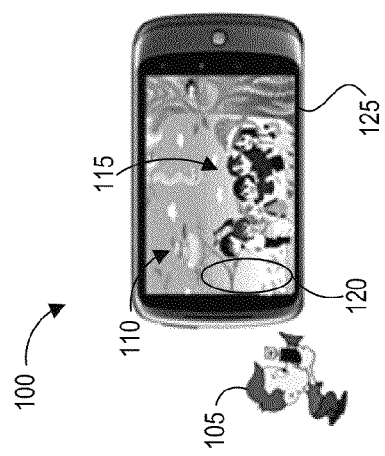

FIGS. 1A-1C illustrate various user interface displays of an image capture device 100 showing several example steps in one possible process for generating a group image from a first image including a first subset of the group and a second image including a second subset of the group. The user interfaces may be presented on a display, such as a viewfinder display, of the image capture device, or on another display associated with the image capture device.

For example, in various implementations and as shown in FIG. 1A, a first image 125 may be captured of a first part of the group 115, and a space 120 in the first image 125 may be reserved for the first photographer 105. The first image 125 may include a first background 110 and a first foreground, the first foreground including the first part of the group 115 and possibly other foreground objects. In some embodiments the image capture device 100 may determine first pixel areas including the foreground and second pixel areas including the background, for example by analyzing depth map data associated with the pixels of the first and second images, or by recognition of objects, such as faces or sky, which are commonly associated with one of image foreground or background regions. In other embodiments the image capture device 100 may perform the image stitching methods described herein without determining the foreground and background.

As illustrated in FIG. 1B, after capturing the first image 125, the first photographer 105 may then move into the space 120 which was reserved for him and a second photographer (illustrated by the hand 135) may assume control of the image capture device. The image capture device 100 may then initiate a superimposed live view to guide capture of a second image 130. In the superimposed live view, as illustrated in FIG. 1B, a live preview of the second image 130 may be presented on the image capture device 100. At least a portion of the first image 125 may be superimposed over the live preview. In other embodiments, the live preview may be superimposed over the first image 125. One or both of the first image 125 and the live preview of the second image 130 may be assigned a certain level of transparency so that both the first image and the live preview are at least partially visible. A user of the image capture device may choose which of the first image and the live preview is the top layer, in some implementations, and can set the opacity of each layer. The second photographer may adjust the position, layout, and/or size of the displayed portion of the first image 125 relative to the live preview. The second photographer may also use the superimposed live view to guide the positioning of the first photographer 105 to be within the reserved space 120 in the second image 130.

The second image 130 may include a background 110 and a second foreground, the second foreground including the first photographer 105. The background of the second image may be substantially the same as the first background 110. In some embodiments the first and second images may be taken from similar viewpoints within a threshold period of time so that the first and second backgrounds will be substantially similar. The image capture device 100 may be configured to provide the second photographer with an indication of the framing of the first image background. The image capture device 100 may also provide the second photographer with other indications regarding a level of similarity of other attributes of the first and second images, for example lighting and location of background objects. In some embodiments the image capture device may compare pixel values of at least some of the pixels of the first image with pixel values of at least some of the pixels of the second image in order to determine the level of similarity of attributes of the first and second images. The pixels values may be, for example, luminance, chrominance, gradient values, or depth values.

As illustrated in FIG. 1C, after capturing the second image 130, the image capture device 100 may compose a final image 135 with substantially seamless stitching or blending by fusing, stitching, or otherwise merging the first image 125 and second image 130 together. The foreground of the first image and the foreground of the second image may be stitched together over the shared background 110. The final 135 image thus contains the entire group, including the first photographer. A user of the camera may exercise some control over the way in which the final image is generated, for example by moving the first and second image relative to each other, by outlining important components in the image scene, or by defining a boundary where the first and second images are to be stitched together.

Figure 2A:
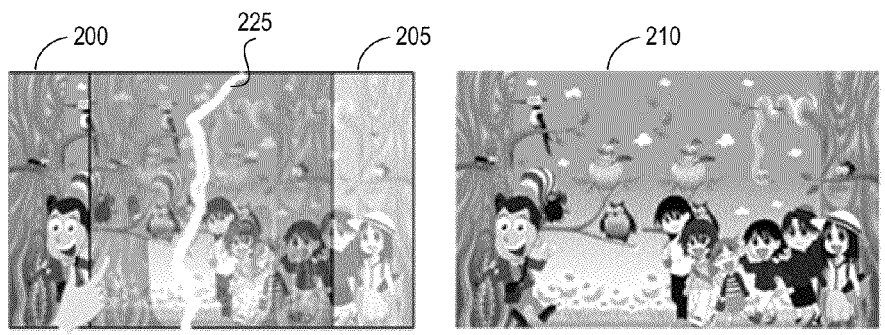
FIGS. 2A-2C illustrate a pair of images in various overlapped arrangements with seam lines displayed within overlapped areas.
Figure 2B:
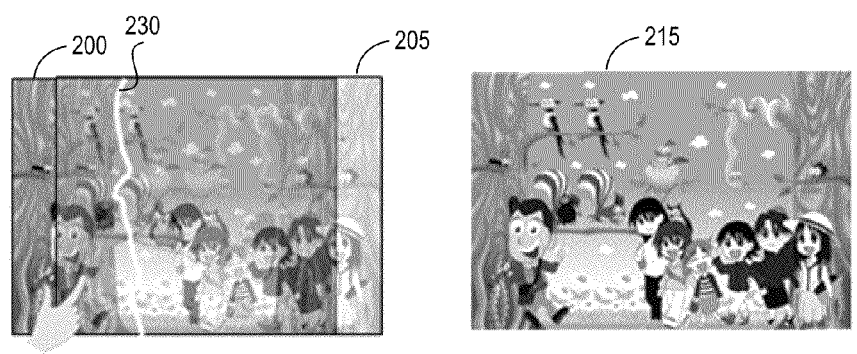
Figure 2C:
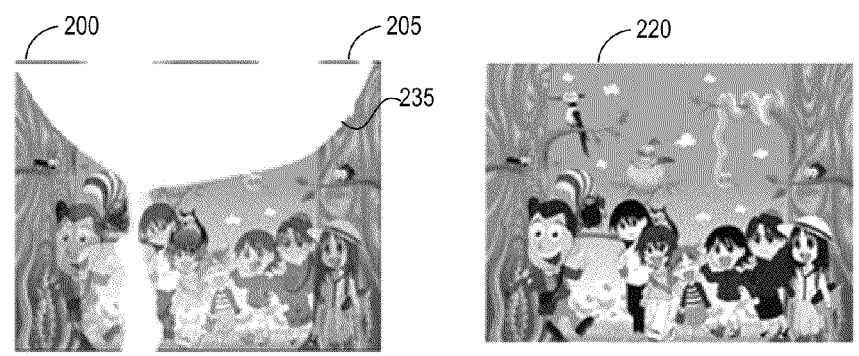

FIGS. 2A-2C illustrate a pair of images 200, 205 in various overlapped arrangements. The overlap areas are displayed with a seam line or lines. The seam lines represent the boundary where a portion of the first image can be stitched to a portion of the second image. In some embodiments, seam lines may be used to determine a boundary between the first foreground and the second foreground stitched together over a shared background. In some embodiments, seam lines may be determined automatically by the image capture device or another computing device through lowest-energy path determination processes, as will be discussed in more detail below. The lowest-energy path determination process may be a sub-process of the image stitching process described above, or may be used in any image stitching, image blending, or other image combination application. Seam lines may be provided by a user in some embodiments, for example by the user drawing a line indicating a boundary of one or both of the first and second foregrounds, such as with a finger or stylus on a touch-sensitive display. Some embodiments may use lowest-energy path determination techniques to refine a user input seam line.

As illustrated in FIGS. 2A and 2B, a user may align the first image 200 and the second image 205 manually, and may input or be presented with one or more seam lines 225, 230 displayed over the overlapping portion. In some embodiments, a lowest-energy path determination process may be configured to provide a seam line or lines. In other embodiments, a user can input a seam line. In certain embodiments a combination of user input and an automatic process can be used to determine a seam line. The user may also be presented with a preview 210, 215 of how the first and second images 200, 205 would appear if stitched using the displayed seam line and selected overlapping region. As illustrated by the preview images 210, 215, the overlapping regions of FIGS. 2A and 2B do not generate optimal stitched images, as there are background elements duplicated in the stitched images 210, 215.

In some embodiments, the visual appearance of the seam line or lines can provide an indication of a level of energy of the seam line or lines, for example by changing the color of a seam line shown on the display in response to a determination of the level of energy of the seam line. In some embodiments, a red seam line may indicate a high level of energy, which may result in portions of objects in one or both of the first and second foreground being cut off in the final stitched image. Yellow seam lines can indicate a moderate amount of energy, which may result in duplicate background objects being present in the final stitched image, as displayed on the right. Green seam lines, or a green region of the overlapping portion encompassing a plurality of possible seam lines, can indicate a low amount of energy. Other visual indications can be used in other embodiments, and in some embodiments the total seam line energy or another indication separate from the seam line can be displayed to the user for assessment of the seam line energy.

As illustrated in the overlapped first and second images 200, 205 of FIG. 2C, using a seam line within a region 235 of low energy seam lines to cut or crop the first image 200 and the second image 205, or to cut or crop the foreground of the first image and the foreground of the second image to stitch over a shared background, may result in a substantially seamless final stitched image 220 containing all members of the photographed group, and containing no recognizable repeated background objects.

System Overview

Figure 3:
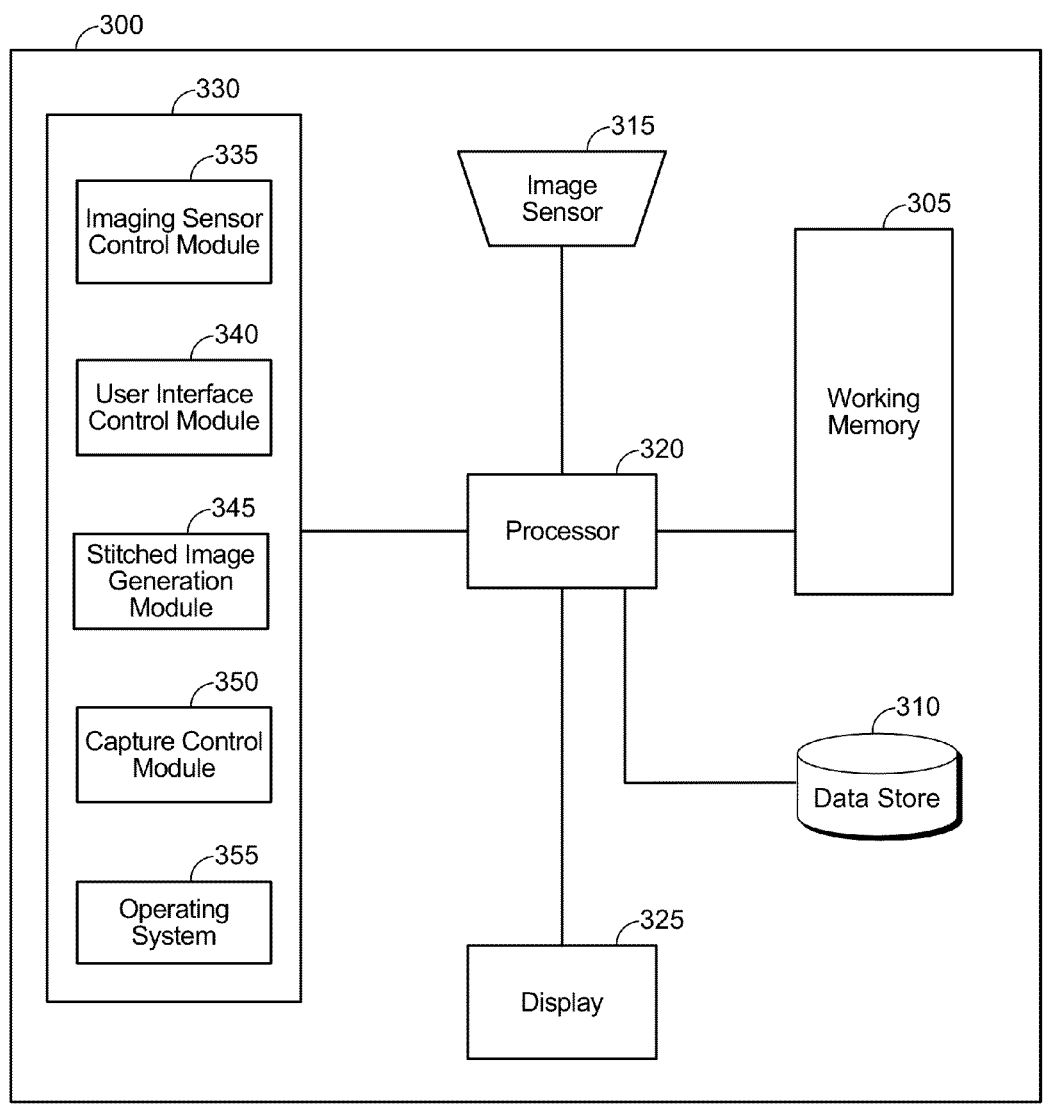
FIG. 3 illustrates a schematic block diagram of an example system for capturing and generating a group or stitched image.

FIG. 3 illustrates a high-level block diagram of an example system 300 for capturing and generating a group or stitched image, the system 300 having a set of components including a processor 320 linked to an imaging sensor 315. A working memory 305, storage 310, electronic display 325, and memory 330 are also in communication with the processor 320.

System 300 may be a device such as cell phone, digital camera, tablet computer, personal digital assistant, or the like. System 300 may also be a more stationary device such as a desktop personal computer, video conferencing station, or the like that uses an internal or external camera for capturing images. System 300 can also be a combination of an image capture device and a separate processing device receiving image data from the image capture device. A plurality of applications may be available to the user on system 300. These applications may include traditional photographic applications, panoramic still images and video, and image stitching applications.

The image capture system 300 includes the image sensor 315 for capturing images. The image sensor 315 can be, for example, a charge-coupled device (CCD), a complementary metal-oxide semiconductor (CMOS) sensor, or the like. The image sensor 315 may be coupled to the processor 320 to transmit a captured image to the image processor 320. The image processor 320 may be configured to perform various operations on a received captured image in order to output a high quality stitched image, as will be described in more detail below.

Processor 320 may be a general purpose processing unit or a processor specially designed for imaging applications. As shown, the processor 320 is connected to a memory 330 and a working memory 305. In the illustrated embodiment, the memory 330 stores an imaging sensor control module 335, user interface control module 340, stitched image generation module 345, capture control module 350, and operating system 355. These modules include instructions that configure the processor to perform various image processing and device management tasks. Working memory 305 may be used by processor 320 to store a working set of processor instructions contained in the modules of memory 330. Alternatively, working memory 305 may also be used by processor 320 to store dynamic data created during the operation of device 300.

As mentioned above, the processor 320 is configured by several modules stored in the memory 330. The imaging sensor control module 335 includes instructions that configure the processor 320 to adjust the focus position of imaging sensor 315. The imaging sensor control module 335 also includes instructions that configure the processor 320 to capture images with the imaging sensor 315. Therefore, processor 320, along with image capture control module 335, imaging sensor 315, and working memory 305 represent one means for capturing an image or set of images to be stitched.

The user interface control module 340 includes instructions that configure the processor 320 to output various user interface elements on the display 325 to guide a user or users in capturing and stitching a set of images. As described above with respect to FIGS. 1A-2C, the user interface elements can include a first image and second image displayed with transparency, a marked location in the first image to reserve space for a photographer of the first image, a seam line or lines, and a preview image. The user interface control module 340 also includes instructions that configure the process 320 to receive user input, for example relative positioning of images to be stitched and seam line input and selection, and to stitch the set of images based at least partly on the user input.

The stitched image generation module may include instructions that configure the processor 320 to stitch a set of images together into a final stitched image. In some embodiments, the instructions may cause the processor to identify a foreground of each of the set of images and to identify a shared background of the set of images. The stitched image generation module can align the set of images and determine an overlapping portion. The stitched image generation module can also include instructions that configure the processor 320 to identify a "low energy" seam line in the overlapping portion and to stitch portions of each image in the set of images together based on the low energy seam line.

Capture control module 350 may include instructions that control the overall image capture functions of the system 300. For example, in an embodiment the capture control module 350 may include instructions that call subroutines to configure the processor 320 to capture first image data of a target image scene using the imaging sensor 315. Capture control module 350 may then call the user interface control module 340 to guide the user in capturing second image data of the target image scene using the imaging sensor 315. Capture control module 350 may also call the stitched image generation module 345 to automatically align first and second images of the target image scene, determine a low energy seam line for an overlapping area of the aligned images, and to stitch the first and second images based on the alignment and seam line. Capture control module 260 can also alternate between calling the user interface control module 340 and the stitched image generation module 345 to supplement image stitching based on user input with automatic alignment and seam line determinations and vice versa.

Operating system module 355 configures the processor 320 to manage the memory and processing resources of the system 300. For example, operating system module 355 may include device drivers to manage hardware resources such as the electronic display 325, storage 310, or imaging sensor 315. Therefore, in some embodiments, instructions contained in the image processing modules discussed above may not interact with these hardware resources directly, but instead interact through standard subroutines or APIs located in operating system component 355. Instructions within operating system 355 may then interact directly with these hardware components.

The processor 320 may be further configured to control the display 325 to display the captured image to a user. The display 325 may be external to an imaging device including the image sensor 315 or may be part of the imaging device. The display 325 may also be configured to provide a view finder for a user prior to capturing an image, or may be configured to display a captured image stored in memory or recently captured by the user. The display 325 may comprise an LCD or LED screen, and may implement touch sensitive technologies. The user interface generated by the user interface control module 340 may be implemented in whole or in part on the display 325. For example, where the display 325 comprises touch sensitive technology, the user interface may be implemented entirely on the display 325. In certain embodiments where touch technology is not used for the display 325, the user interface may include the displayed elements as well as user input means such as buttons or a wheel.

Processor 320 may write data to storage module 310, for example data representing captured images, image alignment, and seam line location and energy data. While storage module 310 is represented graphically as a traditional disk device, those with skill in the art would understand that the storage module 310 may be configured as any storage media device. For example, the storage module 310 may include a disk drive, such as a floppy disk drive, hard disk drive, optical disk drive or magneto-optical disk drive, or a solid state memory such as a FLASH memory, RAM, ROM, and/or EEPROM. The storage module 310 can also include multiple memory units, and any one of the memory units may be configured to be within the image capture device 300, or may be external to the image capture system 300. For example, the storage module 310 may include a ROM memory containing system program instructions stored within the image capture system 300. The storage module 310 may also include memory cards or high speed memories configured to store captured images which may be removable from the camera.

Although FIG. 3 depicts a system comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 3 illustrates two memory components-memory component 330 comprising several modules and a separate memory 305 comprising a working memory—one with skill in the art would recognize several embodiments utilizing different memory architectures. For example, a design may utilize ROM or static RAM memory for the storage of processor instructions implementing the modules contained in memory 330. Alternatively, processor instructions may be read at system startup from a disk storage device that is integrated into system 300 or connected via an external device port. The processor instructions may then be loaded into RAM to facilitate execution by the processor. For example, working memory 305 may be a RAM memory, with instructions loaded into working memory 305 before execution by the processor 320.

User Interface Control System Overview

Figure 4:
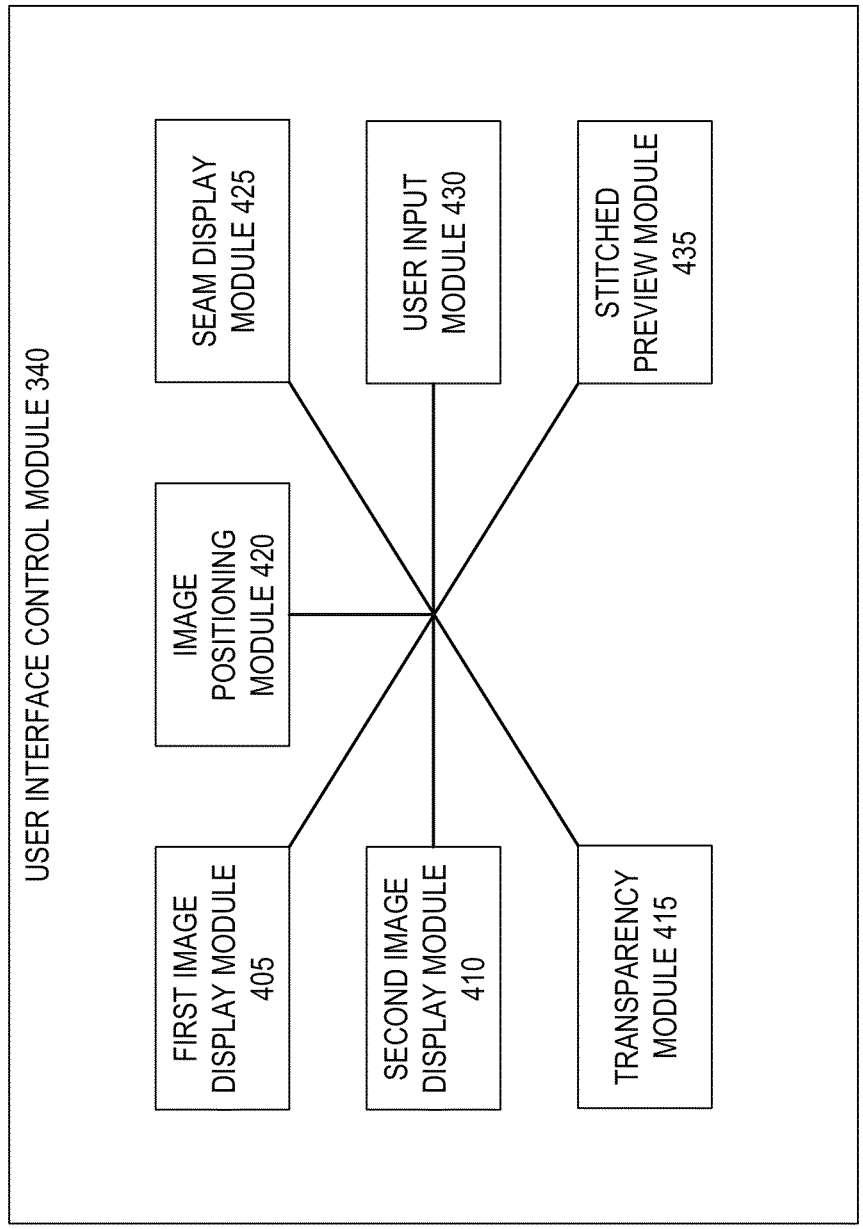
FIG. 4 is a schematic block diagram illustrating an embodiment of a user interface control module.

FIG. 4 illustrates an embodiment of the user interface control module 340 of FIG. 3. The user interface control module 340 includes a first image display module 405, a second image display module 410, a transparency module 415, an image positioning module 420, a seam display module 425, a user input module 430, and a stitched preview module 435. Although discussed within the context of the image capture system 300, the user interface control module 340 can be implemented in other image capture systems suitable for capturing image data of multiple images of a target scene for image stitching, for example systems for panorama image capture and stitching.

The first image display module 405 can include instructions that configure the processor 320 to display a preview image of the first image on the display 325. The preview image can include a marked location reserving space for one or more missing group members, such as the photographer of the first image, as illustrated in FIG. 1A. The first image display module 405 can also include instructions that configure the processor 320 to provide a prompt to the user or photographer requesting whether the reserved space should be on the left or right side of a detected foreground of the first image or in another location, and may also allow the user to select a size of the reserved space. During capture of a second or subsequent image, the first image display module 405 can recall a stored version of the first image from memory for concurrent display with a preview image of the second or subsequent image.

The second image display module 410 can include instructions that configure the processor 320 to display a preview image of the second image on the display 325. The second image display module 410 can also be presented with an indication of the level of similarity between a background portion of the first image with a background portion of the second image, so that a user can assess whether the two images are suitable for stitching, or whether one or both images should be recaptured. The second image display module 410 can include instructions that configure the processor 320 to display framing information of the first image on the display 325 to aid the second photographer in capturing an image having a similar background to that of the first image. In embodiments configured to generate a stitched image of three or more images, additional image display modules can be included in the user interface control module 340.

The transparency module 415 can include instructions that configure the processor 320 to display an overlay of the first image with a preview image of the second image on the display 325 during capture of the second image, and to assign a transparency level to at least one of the first image and the preview image of the second image. After capture of the second image, the transparency module 415 can configure the processor 320 to display an overlay of the first image with the second image on the display 325, and to assign a transparency level to at least one of the first image and the second image. The transparency module 415 can also include instructions that configure the processor 320 to provide a prompt to the user that allows the user to select an image to display with transparency and to assign a level of transparency to the image. For example, the first image can be assigned a level of transparency and assigned to a foreground position, and the preview of the second image or the second image can be assigned to a background position and displayed opaque. In another example, the preview of the second image or the captured second image can be assigned a level of transparency and assigned to the foreground position, and the first image can be assigned to the background position and displayed opaque. In some embodiments, the user can select an option to move the second image to the foreground and the first image to the background, or vice versa.

The image positioning module 420 may align the first and second image, or first image and a preview of the second image, relative to one another. In some embodiments, the first image and second image may initially each be positioned at a default starting position, for example with the second image occupying the entire viewfinder and a first portion of the first image displayed overlaying the second image with a second portion of the first image not displayed, as illustrated in FIG. 1B. The image positioning module 420 can receive user input, for example from the user input module 430, regarding repositioning of the first and second images. In some embodiments, the image positioning module 420 may align the first and second image, or first image and a preview of the second image, based on an analysis of common features from the stitched image generation module 345.

The seam display module 425 can include instructions that configure the processor 320 to display a seam line on the display 325 within an overlapping portion of the first and second images. The seam line location can be received from the user input module 430, in some embodiments. In other embodiments, the seam line location can be received from the stitched image generation module 345. The seam display module 425 can include instructions that configure the processor 320 to alter the visual appearance of the seam line or provide another indication to the user of a total energy level of the seam line. The total energy level of the seam line can be provided by the stitched image generation module 345, and may be useful for the user in assessing a quality level of the final stitched image.

The user input module 430 can communicate with the display 325 and any other user interface elements of the image capture system 300 to receive user input during the image capture and stitching processes. User inputs can be provided for one or more factors during the image capture and stitching process, such as a size and/or positioning of the reserved space for the photographer, transparency assignments, relative positioning of the images, outline of background and foreground, identification of common objects for alignment, seam input, acceptance of a current alignment and seam line for image stitching, and cropping. In some embodiments, where user input is not provided for one or more of the factors, the user input module 430 can provide an indication to the processor 320 to call on the stitched image generation module 345 for the information needed for that factor. In certain embodiments, user inputs and automatic determinations for the factors can be combined, or automatic determinations for factors can be presented to the user as an alternative to the user input for that factor.

The stitched preview module 435 can include instructions that configure the processor 320 to display a preview on the display 325 of what the final stitched image result will look like using a currently selected image alignment and seam line, as illustrated in preview 210, 215, and 220 of FIGS. 2A-2C. In some embodiments, the preview may be displayed together with an overlay of the first and second images on different portions of the display 325. In other embodiments, the stitched preview module 435 can include instructions that configure the processor 320 to present a user-selectable option on the display 325 to switch between the overlay view and the preview view. Presenting the preview can enable the user to make adjustments to relative image alignment and/or seam line location and to view the effects of the adjustments on the final stitched image before opting to proceed with generating the final stitched image.

Automatic Stitched Image Generation System Overview

Figure 5:
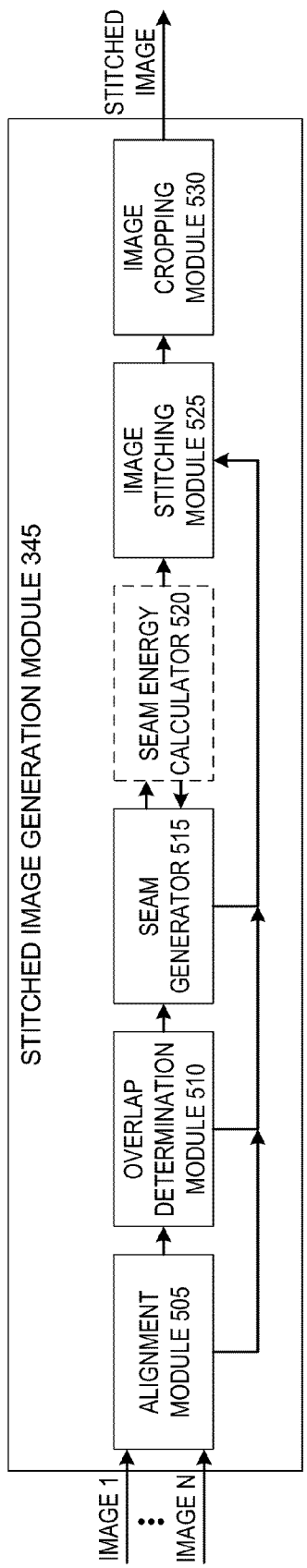
FIG. 5 is a schematic block diagram illustrating an embodiment of a stitched image generation module.

FIG. 5 illustrates an embodiment of the stitched image generation module 345 of FIG. 3, which can be used to supplement user-guided image capture and stitching or in place of the user-guided image capture and stitching to carry out an automated image stitching process. Although discussed within the context of the image capture system 300, the stitched image generation module 345 can be implemented in other image capture systems suitable for capturing image data of multiple images of a target scene for image stitching, for example systems for panorama image capture and stitching.

The stitched image generation module 345 includes an alignment module 505, overlap determination module 510, seam generator 515, seam energy calculator 520, image stitching module 525, and image cropping module 530. Although the image data is depicted as flowing in a linear manner through the various modules of the stitched image generation module 345, in some embodiments individual modules can be called to generate data without passing image data through all of the modules.

Image data of images 1 through N can be input into the alignment module 505. The alignment module 505 can include instructions that configure the processor 320 to align the first and second images. For example, the alignment module 505 can discover the correspondence relationships among the images using known alignment techniques to map pixel coordinates from the first image to corresponding pixel coordinates of the second image. For example, pixel-to-pixel matching or feature-based methods can be used to identify correspondence relationships between the images. The alignment module can transform the rotation, scale, lens distortion, and/or perspective of one of the first and second image to align it with the other of the first and second image based on the correspondence relationships. The alignment module 505 can transmit the aligned image data to the image stitching module 525.

The aligned image data can be transmitted from the alignment module 505 to the overlap determination module 510. The overlap determination module 510 can include instructions that configure the processor 320 to identify an overlapping region of the aligned first and second images. The overlapping region can be identified, in some embodiments, by locating the X and Y values for the edges of each aligned image. Each image has a top, bottom, left, and right edge. Using an (x,y) coordinate system encompassing a rectangular area containing both aligned images with the x-axis extending horizontally and the y-axis extending vertically, each top edge and each bottom edge can be assigned a Y value based on its vertical positioning within the coordinate system, and each left edge and each right edge can be assigned an X value based on its horizontal positioning within the coordinate system. If the top left pixel of the coordinate system is labeled as (0,0), the overlapping region for two or more images can be defined by the top edge having the highest Y value, the bottom edge having the lowest Y value, the left edge having the highest X value, and the right edge having the lowest X value. This example is provided for illustrative purposes and other known means for ascertaining the overlapping region can be implemented by the overlap determination module 510 in other embodiments. The overlap determination module 510 can transmit the overlap region to the image stitching module 525.

The overlap region can be transmitted from the overlap determination module 510 to the seam generator 515. The seam generator 515 can include instructions that configure the processor 320 to identify at least one low energy seam line within the overlapping region. The low energy seam line can represent a boundary between the first image and the second image that can possibly produce a high-quality final stitched image. The low energy seam line generation process may begin at a starting pixel, which may be the left-most pixel in the top row of the overlapping region in some embodiments, but could be any other pixel within the overlapping region in other embodiments. The low energy seam line generation process may then compute a difference value between the pixel values from the first image and the second image for each of the pixels adjacent to the starting pixel. The pixel having the lowest difference value may be set as a current seam line pixel, and the seam line may be drawn in the direction of the current seam line pixel. In some instances, the low energy seam line generation process may determine that the seam line currently being generated is not suitable for image stitching and may begin with a new starting pixel. These steps may be repeated until the seam line is completed.

The seam line location data and the difference values for each pixel in the seam line (excepting the starting pixel) can optionally be transmitted from the seam generator 515 to the seam energy calculator 520 in some embodiments. The seam energy calculator 520 can include instructions that configure the processor 320 to calculate the total energy level of the seam line, for example by summing the difference values. In some embodiments, if the total energy level of the seam line is above a threshold, then the seam energy calculator 520 can include instructions that configure the processor 320 to call the seam generator 515 to generate a new seam line. The seam energy calculator 520 can output the seam line location to the image stitching module 525. In other embodiments, the seam generator 515 may output the seam line location directly to the image stitching module 525.

The image stitching module 525 include instructions that configure the processor 320 to use the image alignment data and the seam line location to generate a stitched version of images 1 through N. For example, for a two-image set, pixels from a left-most image of the two images located to the left of the seam line can be mapped to the final stitched image, while pixels from a right-most image of the two images located to the right of the seam line can be mapped to the final stitched image, taking care to correct for potential problems such as blurring or ghosting caused by parallax and scene movement as well as varying image exposures. For image sets including three or more images, pixels located to the left and right of, as well as between boundaries formed by, multiple seam lines can be blended together to form the final image. Along seam lines, the image stitching module 525 can combine, weight, blend, or select pixel values from one or both images being stitched along the seam line.

The stitched image data generated by the image stitching module 525 can be transmitted to the image cropping module 530. The cropping module 530 can crop the stitched image data to a desired ratio, for example a common image ratio or a ratio preset by a user. The cropping module 530 can crop the stitched image to exclude empty pixel regions from the final stitched image. The final stitched image can be output from the image stitching module 525 for storage and/or presentation to a user.

Although the stitched image generation module 345, as discussed above, is capable of automatically stitching a set of images together without user input, in some embodiments user input regarding one or more image stitching factors such as alignment, seam line, or cropping can be input into the corresponding module of the stitched image generation module 345 to provide a user's preferences or personal touch to the image stitching process. In other embodiments, one or more of the modules of the stitched image generation module 345 can be called to provide information during a user-guided image stitching process in which the user has provided no information for an image stitching factor, or has provided information which may yield a sub-optimal final stitched image result. If a user is involved in the image stitching process, the image stitching module 525 and the image cropping module 530 may be called to generate a preview stitched image, and may be additionally called to generate an updated preview stitched image if the user adjusts one or more of the image stitching factors such as alignment or seam line location.

Overview of Example Image Stitching Processes

Figure 6:
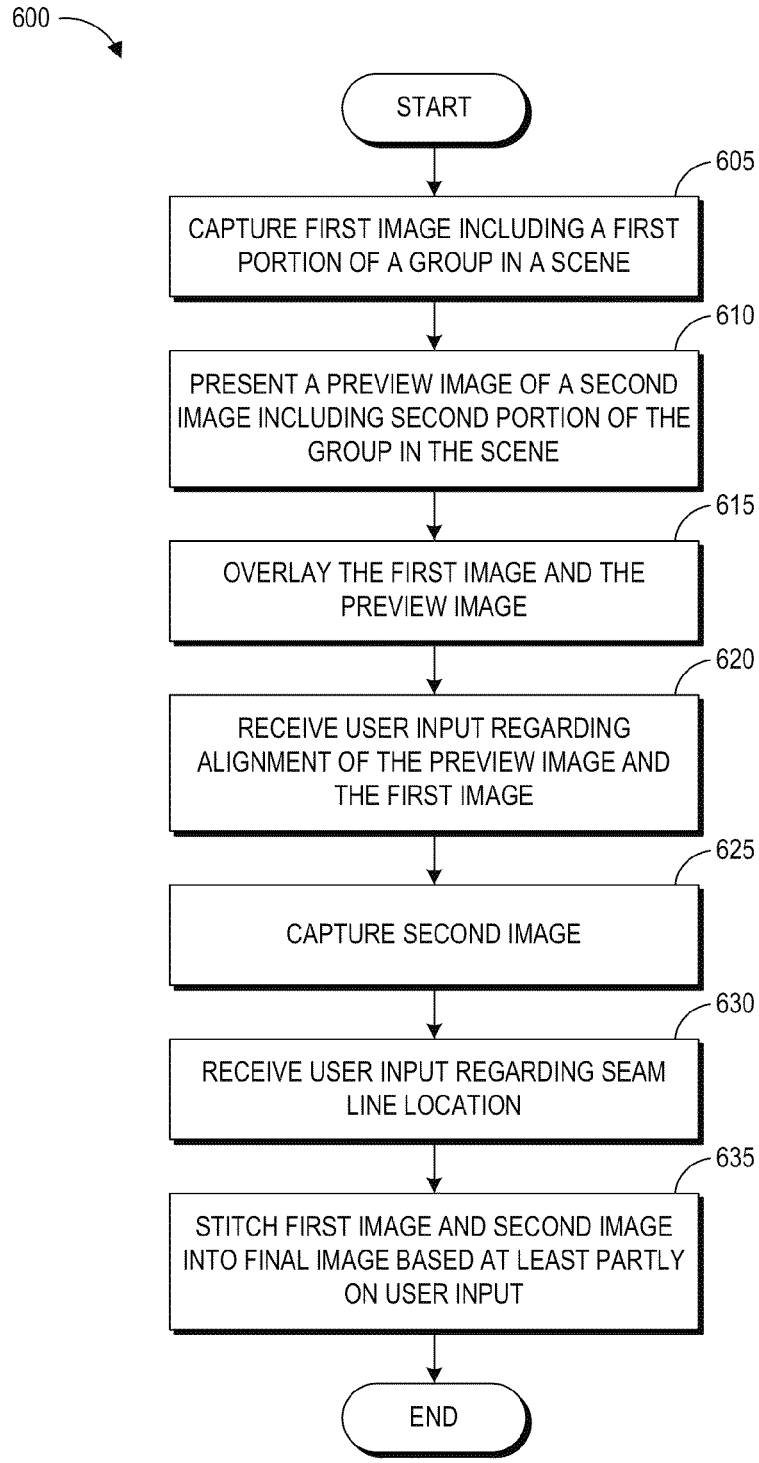
FIG. 6 is a schematic flow diagram illustrating an example process for user-guided image stitching.

FIG. 6 illustrates an example process 600 for user-guided image stitching. For ease of illustration, process 600 is discussed as being implemented by the user interface control module 340 of FIGS. 3 and 4. Other suitable image capture systems can implement process 600 in other embodiments.

The process 600 begins at block 605 when a first image is captured of a target scene including a first portion of a group. Block 605 can be carried out by a combination of the first image display module 405, the image sensor 315, and the imaging sensor control module 335 in some embodiments. One embodiment of block 605 is illustrated in FIG. 1A.

The process 600 then transitions to block 610 in which the second image display module 410 presents a preview image of a second image of the target scene, the second image including a second portion of the group, on the display 325 of the image capture system 300. The process 600 then transitions to block 615, in which the transparency module 415 and the first image display module 405 cooperate to overlay the first image and the preview image of the second image, using transparency for at least one of the images so that the features of the displayed areas of both images can be seen simultaneously by the user. The process 600 transitions to block 620 in which the user input module 430 receives user input regarding the alignment of the first image and the preview image, and the image positioning module 420 stores the relative alignment set by the user. In some embodiments, block 620 can be supplemented or executed by the alignment module 505 of FIG. 5. One embodiment of block 610, 615, and 620 is illustrated in FIG. 1B.

The process 600 transitions to block 625 in which the a second image of the target scene is captured including a second portion of the group. Block 625 can be carried out by a combination of the second image display module 410, the image sensor 315, and the imaging sensor control module 335 in some embodiments. At block 630, the user input module 430 can receive user input regarding a seam line location for a boundary at which to stitch the first image and the second image. Block 630 can be supplemented or executed out by seam generator 515 in some embodiments.

At block 635, the process 600 stitches the first image and the second image and crops the stitched image into a final image based at least partly on the user input regarding relative image alignment and seam line location. Optionally, stitched preview module 435 can present a preview of a final stitched image to the user to enable the user to judge the quality and make any desired adjustments to the relative image positioning and/or seam line location. The final stitched image may be stored and/or displayed to the user. In some embodiments, some or all of the image data including the first and second images, relative alignment of the first and second images, and the seam line location may be discarded after completion of the final stitched image. In other embodiments, some or all of such image data may be retained to allow the user to access and modify the original images.

Figure 7:
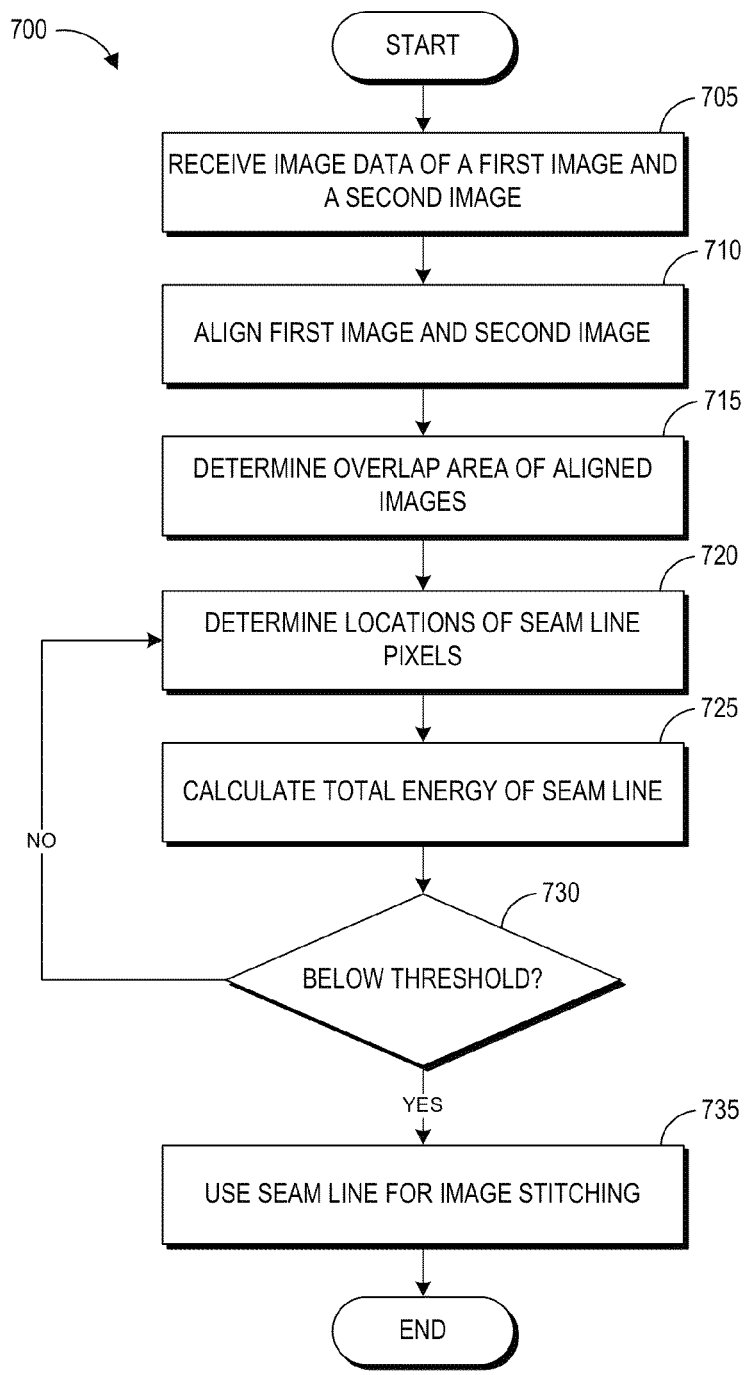
FIG. 7 is a schematic flow diagram illustrating an example process for determining a seam line for stitching two images together.

FIG. 7 illustrates an example process 700 for automatically determining a seam line for stitching two images together. For ease of illustration, process 700 is discussed as being implemented by the stitched image generation module 345 of FIGS. 3 and 5. Other suitable image stitching systems can implement process 700 in other embodiments.

The process 700 begins at block 705 when image data of a first and second image is received by the alignment module 505. The first image includes a first portion of a group and a first background. The second image includes a second portion of the group and a second background that is substantially similar to the first background. In other embodiments, image data including three or more images may be received by the alignment module 505, wherein each image contains a portion of a group and a substantially similar background to the backgrounds of the other images.

The process 700 transitions to block 710, in which the alignment module 505 aligns the first image and the second image, for example by a pixel-by-pixel comparison or by feature matching, as discussed above. Next, the process 700 transitions to block 715 at which the overlap determination module 510 determines an overlap area of the aligned images, for instance by any of the methods discussed above with respect to FIG. 5.

At block 720, the seam generator 515 determines the locations of seam line pixels. The seam generator 515 may begin at a starting pixel, which may be the left-most pixel in the top row of the overlapping region in some embodiments, but could be any other pixel within the overlapping region in other embodiments. The seam generator 515 may then compute a difference value between the pixel values from the first image and the second image for each of the pixels adjacent to the starting pixel. The pixel having the lowest difference value may be set as a current seam line pixel, and the seam line may be drawn in the direction of the current seam line pixel. In some instances, the seam generator 515 may determine that the seam line currently being generated is not suitable for image stitching and may begin with a new starting pixel. These steps may be repeated until the seam line is completed.

At block 725, the seam energy calculator 520 total energy of the seam line calculates a total energy of the seam line generated by the seam generator 515 at block 720, for example by summing the difference values of each seam line pixel excepting the starting pixel, which is not assigned a difference value in some embodiments. At decision block 730, if the seam energy calculator 520 determines that the total energy of the seam line is above a threshold, then the process 700 loops back to block 720 in which the seam generator 515 determines the locations of seam line pixels for a new seam line, for example starting with a different starting pixel. At decision block 730, if the seam energy calculator 520 determines that the total energy of the seam line is below the threshold, then the process 700 continues to block 735. The threshold may be a predetermined energy level for a seam line having N pixels that corresponds to visually pleasing stitching results, or can be a threshold set by a user in some embodiments.

At block 735, the image stitching module 525 uses the seam line location is for stitching the first and second images together. The stitched image is then cropped by the image cropping module 530. The final stitched image may be stored and/or displayed to the user. In some embodiments, some or all of the image data including the first and second images, relative alignment of the first and second images, and the seam line locations and energy levels may be discarded after completion of the final stitched image. In other embodiments, some or all of such image data may be retained to allow the user to access and modify the original images.

Overview of an Example Seam Line Pixel Selection Process

Figure 8:
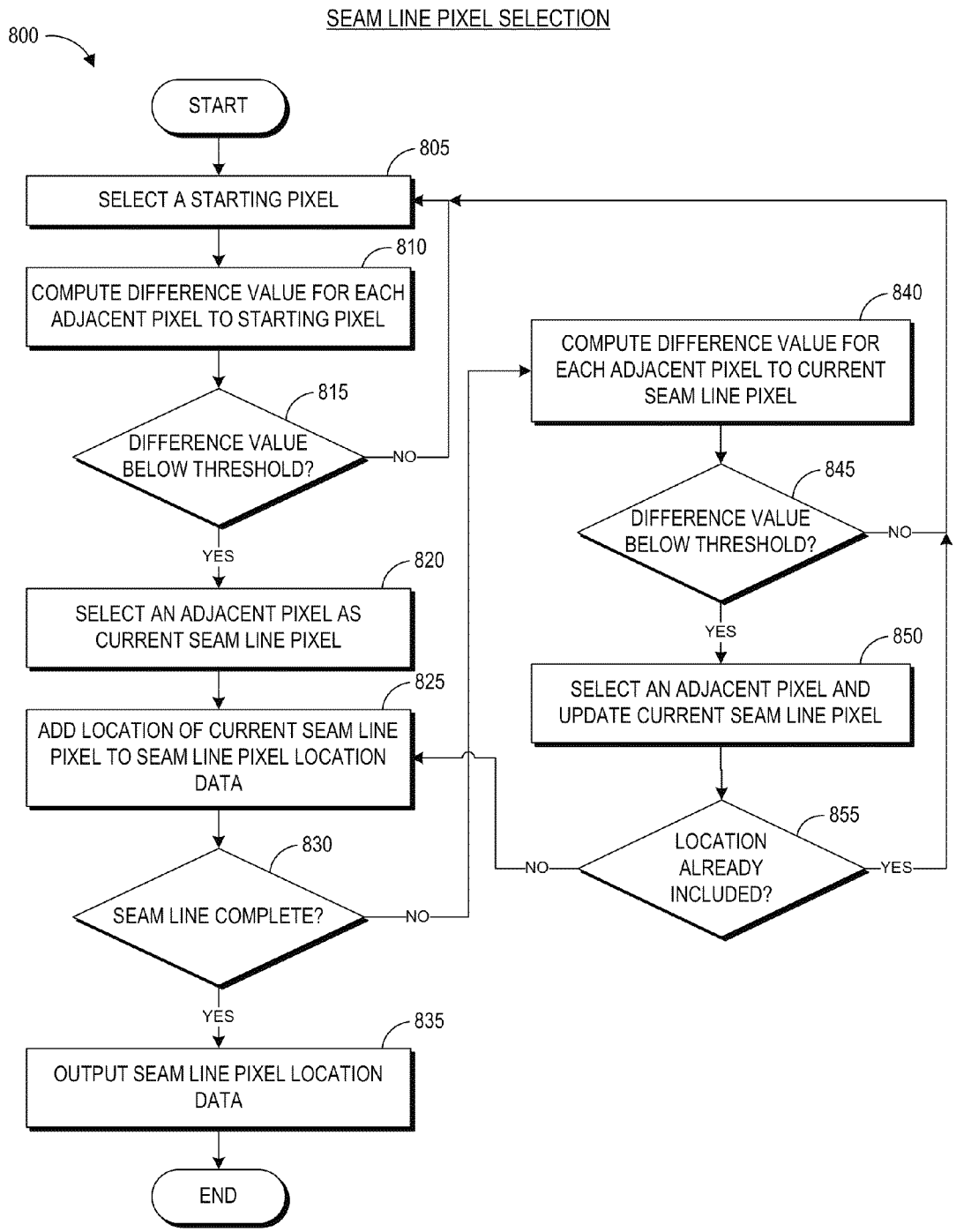
FIG. 8 is a schematic flow diagram illustrating an example seam line pixel selection process.

FIG. 8 illustrates an example seam line pixel selection process 800 which may be used to select the seam line pixels at block 725 of FIG. 7, in some embodiments. Process 800 begins at block 805 in which the seam generator 515 selects a starting pixel, which may be the left-most pixel in the top row of the overlapping region in some embodiments, but could be any other pixel within the overlapping region in other embodiments.

At block 810, the seam line generator 515 computes difference values for each pixel adjacent to the starting pixel. For example, the difference values may be computed in some embodiments by subtracting the gradient values of each pixel of the first image in the overlapping region from the gradient values of the corresponding pixel in the second image, or vice versa. In other embodiments, luminance or chrominance values of the pixels may be used instead of or in addition to gradient values. In embodiments stitching together two grayscale images, one or both of luma and gradient values may be used. In embodiments stitching together two RGB images, some or all of luminance, chrominance, and gradient values may be used.

At decision block 815, the seam line generator 515 compares the difference value of each of the adjacent pixels to a threshold. The threshold may indicate an acceptable level of difference between pixels in generating a seam line that will produce visually pleasing stitched image results, such as by not cutting objects. A difference value over the threshold can indicate an object edge in some embodiments. If no adjacent pixel has a difference value below the threshold, then the process 800 loops back to block 805 to select a new starting pixel. The new starting pixel may be a next top row pixel in some embodiments, or in some embodiments the seam line generator 515 may add a value to an X or Y value in an (x,y) coordinate pair defining the location of the previous starting pixel, dependent upon whether the seam line is being generated vertically or horizontally, to determine a location of a new starting pixel.

If, after iterations of blocks 908 through 815, the seam line generator 515 determines that no pixel adjacent to a starting pixel in the overlapping region has a difference value below the threshold, then the lowest-energy path determination process may indicate to the user that the first image and second image do not contain sufficient similarities, and the user may be presented with a selectable option to adjust the threshold or to capture new images for stitching.

If at least one adjacent pixel has a value below the threshold, then the process 800 transitions to block 820 in which the seam line generator 515 sets an adjacent pixel as a current seam line pixel. In some instances, multiple adjacent pixels may have difference values below the threshold. In one embodiment, the pixel having the lowest difference value may be set as a current seam line pixel. In another embodiment, the seam line generator 515 may determine a direction in which the seam line is being drawn, i.e. a top overlap edge to a bottom overlap edge, and the adjacent pixel with a difference value below the threshold that continues the seam line in the correct direction can be selected. In some embodiments, an edge map may be determined for the overlap area, and adjacent pixels may be selected to maintain a threshold distance from identified edges. The selected adjacent pixel is set as the current seam line pixel.

At block 825, the seam line generator 515 adds a location of the current seam line pixel to a set of seam line pixel location data. The seam line pixel location data includes the location, for instance an (x,y) coordinate with the coordinate frame defined as the overlap region of the images, of the starting pixel and each selected seam line pixel. The seam line pixel location data may be used to construct the seam line as well as to define the boundary between the images during image stitching.

At decision block 830, the seam line generator 515 uses the location of the current seam line pixel to determine whether the seam line is complete. For example, seam line generator 515 can determine that the seam line is complete based on the location data indicating that the current seam line pixel is located along an edge opposing the starting seam line pixel. To illustrate, in embodiments which begin drawing the seam line with a starting pixel in the top row, the final row may be the bottom row. A seam line can be drawn from left to right or vice versa in some embodiments. In some embodiments, if the seam line terminates on an edge row, the process may present the seam line to the user with an indication that the seam line may provide for an incomplete final stitched image, or may begin again with a new starting pixel.

If the seam line generator 515 determines at block 830 that the seam line is not complete, then the process 800 transitions to block 840 to compute difference values for each pixel adjacent to the current seam line pixel, similar to block 810 in which the seam line generator 515 computed difference values for the pixels adjacent to the starting pixel. At block 845, the difference values for the pixels adjacent to the current seam line pixel are compared to the threshold, similar to the comparison performed at block 815. If no difference value is below the threshold, then the process 800 loops back to block 805 to select a new starting pixel. If there is at least one adjacent pixel having a difference value below the threshold, then the process 800 transitions to block 85 to select one of the adjacent pixels with a difference value below the threshold as the next current seam line pixel.

At decision block 855, the seam line generator 515 compares the location of the current seam line pixel to the locations in the seam line pixel location data to determine whether the currently selected seam line pixel was previously included in the seam line. This beneficially prevents the seam line generation process 800 from becoming stuck in an infinite loop in which it continuously determines a circular path for the seam line. If the current seam line pixel location matches any entry within the previous seam line pixel location data, then the seam line has crossed back to itself and the process may become stuck in an infinite loop if allowed to continue. Accordingly, if the current seam line pixel location matches any entry within the previous seam line pixel location data, then the process 800 may loop back to block 805 select a new starting pixel and begin again.

In some embodiments, rather than looping back to block 805 to select a new starting pixel if the updated current seam line pixel is included in the seam line pixel location data, the process 800 may loop back to block 850 for updating the current seam line pixel and may select a different adjacent pixel, so long as the different adjacent pixel's difference value is lower than the threshold. If all adjacent pixels having a difference value below the threshold are tested against the seam line pixel location data and are found to be included, the threshold may be raised or the process 400 may loop back to block 805 and select a new starting pixel. In some embodiments the process 800 may test each adjacent pixel against the seam line pixel location data at block 855 before selecting an adjacent pixel as the current seam line pixel. In some embodiments the adjacent pixels may be tested sequentially, for example from top to bottom and left to right, and once the first-tested adjacent pixel is reached the process 800 may loop back to step 805 if all adjacent pixels are already included in the seam line pixel location data.

At decision block 855, if the seam line generator 515 determines that the location of the current seam line pixel is not present in the existing seam line location data, then the process 800 transitions to block 825 at which the seam line generator 515 adds the location of the current seam line pixel to a set of seam line pixel location data. The process 800 again transitions to block 830 to determine whether the seam line is complete. If the seam line generator 515 determines at block 830 that the seam line is complete, then the process 800 transitions to block 835 to output or store the seam line pixel location data as a completed seam line for presentation to a user or for use in image stitching.

Although not illustrated, in some embodiments, the process 800 may continue wherein the seam energy calculator 520 calculates a total energy level of a completed seam line, for example by summing the difference values of each seam line pixel. The total energy level of the seam line may be compared to a threshold before use in image stitching or before presentation to a user. The total energy of the completed seam line may be used to generate an indication to the user of a likely quality of a final stitched image, or to indicate to automatic process 800 that a new seam line should be generated. In some embodiments a plurality of low energy seam line options may be generated and compared to determine a lowest energy seam line, wherein each low energy seam line option has a total energy level below a threshold.

Additional Embodiments

Though discussed primarily within the context of a first and a second image, the image stitching processes and lowest energy seam line determination processes described herein may accommodate three or more images. For example, multiple low energy seam lines can be determined to stitch multiple images together. The number of seam lines determined may be the number of images minus one. Each of the three or more images, in some embodiments, may be segmented into foreground and background and the three or more foregrounds may be stitched over the common background.

Additionally, the above-described systems and processes can be used in some embodiments to generate video images in addition to still images. Further, though the above description generally discusses generating a stitched image of a group of people, this is for illustrative purposes only and such processes may be beneficial for generating stitched images of other photographic content as well. For example, the disclosed systems and methods can be used to stitch together a sequence of action shots of a person or object in motion over a background.

The image stitching processes as described herein may be implemented using the viewfinder of an image capture device, a separate display in communication with the image capture device, or the display of a computing device receiving image data captured by the image capture device. Accordingly, an image capture device, another computing device having image editing capabilities, or a combination thereof may execute the image stitching processes described herein.

Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method in an electronic device of capturing an image of a group of individuals, the method comprising:
    capturing a first image of a first part of the group;
    generating a live preview on a display of the electronic device of a second image, the second image comprising a second part of the group;
    superimposing at least a portion of the first image onto the live preview of the second image;
    capturing the second image of the second part of the group;
    receiving a user input, the user input specifying a repositioning of the at least a portion of the first image superimposed over the live preview of the second image to a new location relative to the live preview of the second image; and
    stitching the first image and the second image into a final stitched image based at least in part on the user input, the final image comprising the first part of the group and the second part of the group.

2. The method of claim 1, wherein superimposing at least a portion of the first image onto the live preview of the second image comprises assigning a level of transparency to the first image.

3. The method of claim 1, wherein superimposing at least a portion of the first image onto the live preview of the second image comprises:
    assigning a level of transparency to the second image;
    assigning the second image to a foreground position; and
    assigning the first image to a background position.

4. The method of claim 1, wherein the display of the electronic device comprises a touch-sensitive display screen.

5. The method of claim 4, wherein the user input comprises dragging the at least a portion of the first image superimposed over the live preview of the second image using the touch-sensitive display screen.

6. The method of claim 1, further comprising presenting a preview of the final stitched image to the user.

7. The method of claim 6, further comprising:
    receiving updated user input regarding relative positioning of the first image and the second image; and
    stitching the first image and the second image based at least partly on the updated user input.

8. The method of claim 1, wherein the stitching comprises evaluating a plurality of seam lines and an energy level corresponding to each of the plurality of seam lines, and selecting a seam line having a lowest energy level.

9. The method of claim 1, further comprising receiving user input regarding a location of a seam line, wherein the seam line determines a boundary for stitching the first image to the second image.

10. An image capture device, comprising:
    an image sensor configured to capture a first image of a first part of a group of individuals and a second image of a second part of the group;
    a display configured to display a live preview of the second image, the display further configured to display at least a portion of the first image superimposed over the live preview of the second image;
    a user input module configured to receive a user input, the user input specifying a repositioning of the at least a portion of the first image superimposed over the live preview of the second image to a new location relative to the live preview of the second image; and an image stitching module configured to stitch the first image and second image into a final image based at least in part on the user input, the final image comprising the first part of the group and the second part of the group.

11. The image capture device of claim 10, wherein the display is further configured to display an indication of a reserved space for the second part of the group over a live preview of the first image.

12. The image capture device of claim 10, wherein the display is a touch-sensitive display.

13. The image capture device of claim 12, further comprising a user interface, wherein the user interface comprises the touch sensitive display.

14. The image capture device of claim 10, wherein the display is further configured to display a preview of the final image prior to stitching the first image and the second image.

15. The image capture device of claim 10, further comprising a user interface control module configured to manage presentation of the first image, the live preview of the second image, and the second image on the display.

16. The image capture device of claim 15, wherein the user interface control module further comprises a transparency module configured to assign a level of transparency to one of the first image and the live preview of the second image.

17. The device of claim 10, further comprising a seam line generation module configured to locate a low energy seam line in an overlapping region of the first image and the second image.

18. A method of determining a low energy seam line, the method comprising:
as implemented by one or more computing devices configured with specific executable instructions,
receiving image data comprising a first image and a second image;
determining an overlapping region of the first image and the second image, the overlapping region comprising a plurality of pixels;
selecting a starting pixel, the starting pixel adjacent to a plurality of adjacent pixels;
computing a difference value for each of the plurality of adjacent pixels, wherein the difference value is computed by comparing a pixel value of an adjacent pixel to a pixel value of the starting pixel;
selecting one of the plurality of adjacent pixels as a current seam line pixel; and
constructing seam line pixel location data comprising first location data of the starting pixel and second location data of the current seam line pixel.

19. The method of claim 18, wherein determining an overlapping region comprises aligning the first image and the second image.

20. The method of claim 18, wherein determining an overlapping region comprises receiving user input regarding relative positioning of the first image and the second image.

21. The method of claim 18, wherein selecting one of the plurality of adjacent pixels as a current seam line pixel comprises selecting an adjacent pixel having a lowest difference value.

22. The method of claim 18, wherein selecting one of the plurality of adjacent pixels as a current seam line pixel comprises comparing the difference value for each of the plurality of adjacent pixels to a threshold.

23. The method of claim 22, wherein the pixel value is at least one of luma, luminance, chrominance, or gradient.

24. The method of claim 18, further comprising:
computing a difference value for each of a plurality of pixels adjacent to the current seam line pixel; and
selecting one of the plurality of pixels adjacent to the current seam line pixel as an updated current seam line pixel.

25. The method of claim 24, further comprising determining that a location of the updated current seam line pixel is not included in the seam line pixel location data.

26. The method of claim 25, further comprising updating the seam line pixel location data to include third location data of the updated current seam line pixel location.

27. The method of claim 18, further comprising:
generating a plurality of low energy seam lines within the overlapping region; and
receiving user input regarding selection of one of the plurality of low energy seam lines to use for stitching the first image to the second image.

28. A seam line generation system comprising:
an overlap determination module configured to determine an overlapping region of a first image and a second image, wherein the overlapping region comprises a plurality of pixels;
a seam generator configured to:
select a starting pixel, the starting pixel adjacent to a plurality of adjacent pixels;
compute a difference value for each of the plurality of adjacent pixels,
wherein the difference value is computed by comparing a pixel value of an adjacent pixel to a pixel value of the starting pixel;
select one of the plurality of adjacent pixels as a current seam line pixel;
construct seam line pixel location data comprising first location data of the starting pixel and second location data of the current seam line pixel; and
generate a low energy seam line within the overlapping region, the low energy seam line representing a boundary for stitching the first image to the second image.

29. The seam line generation system of claim 28, further comprising an image stitching module configured to stitch the first image to the second image using the low energy seam line.

30. The seam line generation system of claim 28, further comprising an alignment module configured to align the first image and the second image.

* * * * *